US012579095B2

(12) United States Patent
Ramakrishnan et al.

(10) Patent No.: US 12,579,095 B2
(45) Date of Patent: Mar. 17, 2026

(54) SYSTEM AND METHOD FOR DYNAMICALLY FREEZING INFORMATION HANDLING SYSTEM PORTS TO MINIMIZE POWER CONSUMED BY IDLE PLUG AND PLAY DEVICES

(71) Applicant: Dell Products, LP, Round Rock, TX (US)

(72) Inventors: Malathi Ramakrishnan, Tamil Nadu (IN); Deeder M. Aurongzeb, Austin, TX (US); Manikandan Radhakrishnan, Tamilnadu (IN)

(73) Assignee: DELL PRODUCTS LP, Round Rock, TX (US)

( * ) Notice: Subject to any disclaimer, the term of this patent is extended or adjusted under 35 U.S.C. 154(b) by 82 days.

(21) Appl. No.: 18/142,728

(22) Filed: May 3, 2023

(65) Prior Publication Data

US 2024/0370397 A1 Nov. 7, 2024

(51) Int. Cl.
*G06F 13/40* (2006.01)
*G06F 13/10* (2006.01)

(52) U.S. Cl.
CPC ........ *G06F 13/4081* (2013.01); *G06F 13/102* (2013.01)

(58) Field of Classification Search
None
See application file for complete search history.

(56) References Cited

U.S. PATENT DOCUMENTS

| | | | |
|---|---|---|---|
| 7,827,425 B2 | 11/2010 | Hutsell | |
| 7,908,501 B2 * | 3/2011 | Kim | G11C 7/1075 |
| | | | 713/323 |
| 8,427,993 B2 | 4/2013 | Jeyaseelan | |
| 8,572,420 B2 | 10/2013 | Dutton | |
| 8,626,450 B2 | 1/2014 | Dooley | |
| 8,775,839 B2 | 7/2014 | Cousson | |
| 9,927,902 B2 | 3/2018 | Burr | |
| 10,268,616 B2 * | 4/2019 | Montero | G06F 13/385 |
| 10,747,707 B1 * | 8/2020 | Vajravel | G06F 13/102 |
| 10,819,920 B1 * | 10/2020 | Hamlin | G06F 1/1686 |

(Continued)

FOREIGN PATENT DOCUMENTS

WO 2011/106160 A2 9/2011

*Primary Examiner* — Kim Huynh
(74) *Attorney, Agent, or Firm* — Prol Intellectual Property Law, PLLC; H. Kenneth Prol

(57) ABSTRACT

An idle plug and play port freezing and carbon dioxide (CO2) minimizing system executing on an information handling system may comprise a plug and play device controller, processor, or embedded controller executing code instructions of the idle plug and play port freezing and CO2 minimizing system to receive a notification that a user presence is not detected and to identify a first peripheral device port operably connected to a first peripheral device from among a plurality of peripheral device ports, where the first peripheral device port has an associated first peripheral device communications profile that indicates a status of push notifications enablement with the first peripheral device, and to cease power supply to the first peripheral device port in the absence of a read/write session currently executing on the peripheral device port and no push notifications enabled to decrease power consumption and CO2 emissions.

20 Claims, 3 Drawing Sheets

(56)　　　　　References Cited

U.S. PATENT DOCUMENTS

| | | |
|---|---|---|
| 2009/0292617 A1 | 11/2009 | Sperling |
| 2010/0070404 A1 | 3/2010 | McConnell |
| 2014/0100937 A1 | 4/2014 | Na |
| 2014/0316964 A1 | 10/2014 | Slutsker |
| 2015/0067374 A1* | 3/2015 | Kim ..................... G06F 13/385 |
| | | 713/324 |
| 2021/0240493 A1* | 8/2021 | Hamlin ................ G06F 9/4418 |

\* cited by examiner

SYSTEM AND METHOD FOR DYNAMICALLY FREEZING INFORMATION HANDLING SYSTEM PORTS TO MINIMIZE POWER CONSUMED BY IDLE PLUG AND PLAY DEVICES

FIELD OF THE DISCLOSURE

The present disclosure generally relates to minimizing an amount of greenhouse gas emissions that may be attributable to operation of an information handling system. More specifically, the present disclosure relates to an idle plug and play port freezing and carbon dioxide (CO2) minimizing system for throttling power supplied to a peripheral device port operably connected to an idle peripheral device to minimize power consumed and resultant carbon dioxide (CO2) emissions.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. An information handling system may further interact with a plurality of peripheral devices via one or more ports where peripheral devices may be input/output (I/O) peripheral devices used for user interaction, data storage, or other functions. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
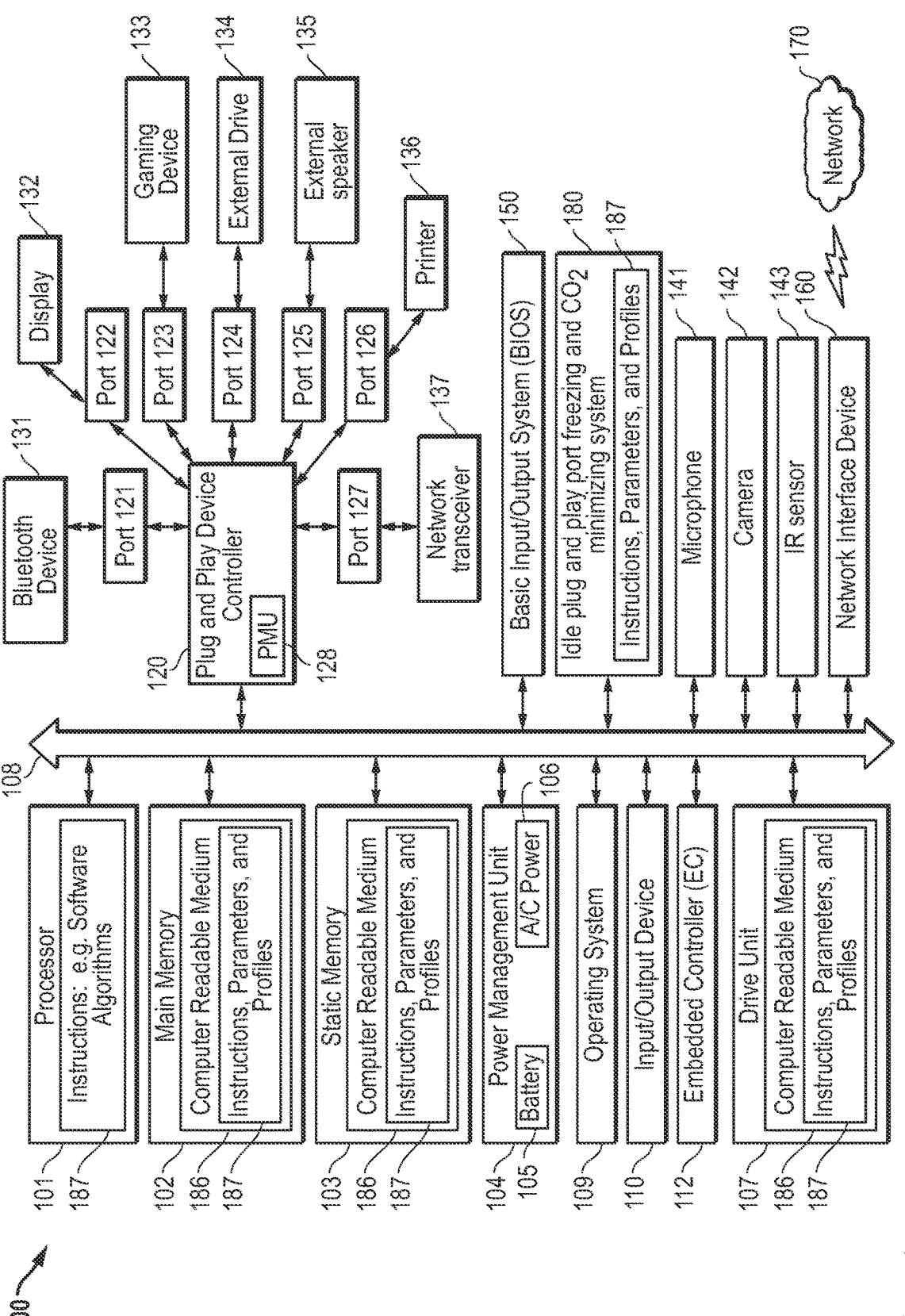
FIG. 1 is a block diagram illustrating an information handling system executing an idle plug and play port freezing and CO2 minimizing system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. GHGs emitted by any given client information handling system (e.g., laptop computer, desktop computer, tablet) within an enterprise network may be dependent upon power consumed during operation of the client information handling system. One way to minimize such power consumption and consequent GHG emissions is to minimize power consumed by idle hardware components when the user of the information handling system is not currently interacting with the information handling system.

The idle plug and play port freezing and CO2 minimizing system in embodiment of the present disclosure may address this issue by identifying one or more peripheral devices not currently in use, and minimizing power consumed by those devices. In embodiments described herein, a processor, controller or some combination executing code instruction portions of the idle plug and play port freezing and CO2 minimizing system to identify when a user is no longer detected by sensors within the proximity of or user-interaction activity with the information handling system. Upon such a determination, the processor, controller or some combination executing code instruction portions of the idle plug and play port freezing and CO2 minimizing system may determine whether to throttle power supplied to the peripheral device port (e.g., USB-C port) operably connecting the peripheral device to the information handling system, based on current read/write activity between the peripheral device and the information handling system or on the status of the peripheral device as push-notification-enabled, or enabled for automatic communication with the information handling system. When push notifications or automatic communications are enabled within communication profiles accessible by a plug and play device controller (e.g., Thunderbolt® controller), the hardware processor of the information handling system may execute code instructions of the idle plug and play port freezing and CO2 minimizing system (e.g., BIOS code instructions) to continue to supply power to the peripheral device operably connected to the push-notification or automatic connection enabled device. In other embodiments described herein, the peripheral device may comprise a mass storage device (e.g., external drive), or may have push notifications and automatic communications disabled. In such a scenario, the hardware processor may execute code instructions of the idle plug and play port freezing and CO2 minimizing system to throttle power supplied to the peripheral device port operably connecting the peripheral device to the information handling system upon cessation of a currently executing read/write session, or upon determination that no such read/write session is currently executing. In such a way, the idle plug and play port freezing and CO2 minimizing system may identify one or more peripheral devices operably connected to the information handling system via peripheral device ports that are currently idle, and throttle power to those peripheral device ports to minimize power consumed and GHGs emitted due to operation of such idle peripheral devices.

FIG. 1 illustrates an information handling system 100 according to several aspects of the present disclosure. As described herein, an information handling system 100 may execute code instructions of an idle plug and play port freezing and CO2 minimizing system 180, via a hardware controller or a hardware processor, to identify one or more peripheral devices operably connected to the information handling system 100 via peripheral device input/output (IO) ports managed by the hardware controller that are currently idle, and throttling power to those peripheral devices to minimize power consumed and carbon dioxide (CO2) emitted due to operation of such idle peripheral devices. In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication.

The information handling system 100 may include a memory 102, (with computer readable medium 186 that is volatile (e.g. random-access memory (RAM), dynamic RAM (DRAM), etc.), nonvolatile memory (read-only memory, flash memory, non-volatile RAM (NVRAM), etc.) or any combination thereof), one or more hardware processing resources. Hardware processing resources may include a central processing unit (CPU), an embedded controller (EC), a graphics processing unit (GPU), a Visual Processing Unit (VPU) or a Hardware Accelerator, any one of which may be the hardware processor 101 or EC 112 illustrated in FIG. 1 and may include any combination thereof. Additionally, according to embodiments herein, a further hardware processing resource may include a plug and play device controller 120 which may execute code instructions 187 of portions of the embodiments herein. Additional components of the information handling system 100 may include one or more storage devices 103 or 107, a wireless network interface device 160, one or more communications ports (e.g., 121, 122, 123, 124, 125, 126, or 127) for communicating with external devices (e.g., 131, 132, 133, 134, 135, 136, or 137), as well as various input and output (I/O) devices 110, such as a keyboard, a mouse, touchpad or any combination thereof. The information handling system 100 may also include one or more buses (e.g., 108) operable to transmit communications between the various hardware components.

The information handling system 100 in an embodiment may comprise a plurality of ports through which a peripheral device may be connected according to various communications standards. These port communication standards may include, for example, Universal Serial Bus (USB) protocols of various generations, such as USB 1, USB 2.0, USB 3.0, USB 3.1, USB 3.2, USB4 and future implementations in some embodiments. Each of these peripheral devices (e.g.,

131, 132, 133, 134, 135, 136, or 137) may comprise "plug and play" devices in that, upon connection to their respective ports (e.g., 121, 122, 123, 124, 125, 126, or 127), the connected plug and play device may transmit a signal to the plug and play device controller 120 identifying the type of device connected and further may indicate types of data connections and data streams, push notification availability, and functions such as read/write capabilities of the type of peripheral device connected and associated with each peripheral device port. The plug and play device controller may determine and store port communications profiles including identification of a peripheral device port, port protocol identification, and peripheral device identification and may further include the type of peripheral device operatively coupled to a port, the functional operations conducted with the peripheral device via the port such as read/write operations, or the capability or permissions to send or receive push notifications for the peripheral device operatively coupled to a peripheral device port. For example, the peripheral device ports (e.g., 131, 132, 133, 134, 135, 136, or 137) in an embodiment may comprise USB ports operating to receive a USB class code assigned to any connected peripheral device (e.g., 121, 122, 123, 124, 125, 126, or 127). These USB class codes in an example embodiment may identify the type of peripheral device connected, such as audio device, printer, mass storage device, data hub, smart card, video device, wireless controller, human interface device (e.g., mouse or keyboard), still imaging device (e.g., camera), or communications device class (CDC) (e.g., networking cards or adapters) and the capabilities above to receive push or send notifications or data function capabilities such as read/write capabilities. Receipt of such a USB class code in an embodiment may prompt the plug and play device controller 120 to load a firmware driver associated with that device type to enable communications between the hardware processor 101 or an EC 112 of the information handling system and the peripheral device (e.g., 121, 122, 123, 124, 125, 126, or 127).

In an example, port 121 in an embodiment may operably connect the information handling system 100 or EC 112, via the plug and play device controller 120 and the serial bus 108, to a Bluetooth® enabled communication peripheral device 131 that includes a wireless transceiver capable of communication according to the Bluetooth® communication standard. As another example, port 122 may operably connect the information handling system 100 to a peripheral video display 132 in an embodiment. The video display 132 in an embodiment may function as a liquid crystal display (LCD), an organic light emitting diode (OLED), a flat panel display, or a solid-state display.

As yet another example, port 123 may operably connect the information handling system 100 in an embodiment to a peripheral gaming device 133 such as a wired or wireless handheld game controller, a wired or wireless virtual reality or augmented reality headset, a wired or wireless gaming keyboard, a wired or wireless gaming mouse, or a wired or wireless headset with or without microphone capabilities. As another example, in an embodiment port 124 may operably connect the information handling system 100 to a peripheral external hard drive 134 for storage of data remotely from the memory (e.g., 102, 103, 107) of the information handling system 100.

In still another example, port 125 may operably connect the information handling system 100 in an embodiment to a peripheral external sensor 135, such as a microphone, camera, temperature sensor, infrared (IR) sensor, fingerprint sensor, or retinal scanner. Each of these external sensors (e.g., 135) in an embodiment may be capable of scanning the environment surrounding the information handling system 100 to detect the presence or absence of a user of the information handling system 100. In yet another example, port 126 in an embodiment may operably connect the information handling system 100 to a peripheral printer 136. In still another example embodiment, port 127 may operably connect the information handling system 100 to a network transceiver 137 which may provide a wired or wireless connection to a wide area network, or a local area network in various embodiments described herein. More specifically, network transceiver 137 may be a wired USB ethernet adapter, a wired local area network (LAN) transceiver, a wireless LAN (WLAN) transceiver, a wired wide area network (WAN) transceiver, or a wireless WAN (WWAN) transceiver.

A power management unit (PMU) 104 supplying power to the information handling system 100, via a battery 105 or an alternating current (A/C) power adapter 106 may supply power to one or more components of the information handling system 100, including the plug and play device controller 120, memory (e.g., 102, 103, or 107), hardware processor 101, the EC 112, or other hardware processing resources executing the operating system 109 or BIOS, and the plug and play device controller 120 managing operations of the plurality of peripheral device ports (e.g., 121, 122, 123, 124, 125, 126, and 127) and various an input/output (I/O) devices 110, microphone 141, camera 142, or other components of an information handling system 100. The plug and play device controller 120 in an embodiment may manage power supply to one or more peripheral devices (e.g., 131, 132, 133, 134, 135, 136 or 137) that may include further examples of I/O devices 110 via their respective ports (e.g., 121, 122, 123, 124, 125, 126, or 127). For example, the plug and play device controller 120 in an embodiment may comprise a Thunderbolt® controller, including an internal PMU 128 that operates to receive power from the PMU 104 of the information handling system 100 and to deliver power to one or more of the peripheral devices. For example, the plug and play device controller 120 in an embodiment may comprise the Thunderbolt® controller of a docking station having a plurality of ports (e.g., 121, 122, 123, 124, 125, 126, or 127) available to information handling system 100 in addition to onboard ports managed according to firmware code instructions executed by the Thunderbolt® controller (e.g., plug and play device controller 120) while serving software and firmware applications executed via the hardware processor 101 or EC 112.

The information handling system 100 may execute code instructions 187, via one or more hardware processing resources including any combination of hardware processor 101, EC 112, or plug and play device controller 120 according to methods and embodiments of the present disclosure. For example, one or more hardware processing resources, including any combination of hardware processor 101, EC 112, or other controllers, may execute code instructions 187 for the idle plug and play port freezing and CO2 minimizing system 180. Further, code instructions 187, including any portion of the idle plug and play port freezing and CO2 minimizing system 180, may operate on servers or systems, remote data centers, or on-box according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers (EC) or other controller including the plug and play device controller 120, or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system with processing resources executing code instructions of an idle plug and play port freezing and CO2 minimizing system 180, operating system (OS) software 109, application software, basic input output system (BIOS) software 150, or other software applications or drivers detectable by hardware processor type 101. In some embodiments, the hardware processor 101, EC 112, or plug and play device controller 120 may execute some or all portions of the code instructions for the idle plug and play port freezing and CO2 minimizing system 180 according to embodiments herein. In other embodiments, the idle plug and play port freezing and CO2 minimizing system 180 may execute as a portion of BIOS code instructions 150 and be executed via a combination of processing resources as well including the EC 112, hardware processor 101, or plug and play device controller 120.

Any combination of the hardware processor 101, EC 112, or plug and play device controller 120 in an embodiment may execute code instructions (e.g., including portions of BIOS code instructions 150) of the idle plug and play port freezing and CO2 minimizing system 180 to communicate with the operating system 109, the microphone 141, the camera 141, memory (102, 103, or 107), or any one of the peripheral device (e.g., plug and play device) ports (e.g., 121, 122, 123, 124, 125, 126, or 127). For example, the operating system 109 may track when a user is currently logged into the operating system 109 and whether a user has interacted with the information handling system via any I/O device 110, and may store such interaction information in non-volatile memory (e.g., 102, 103 or 107). That interaction information may be accessible by the BIOS 150 even when the operating system 109 is not currently executing or is idle in some embodiments. In an embodiment, the operating system 109 may transmit a notification to the idle plug and play port freezing and CO2 minimizing system 180 when a user logs out or ends a current session with the operating system 109 or when a period of time has passed without user interaction being detected or received. Further, sensors may determine if a user is proximate to the information handling system. Upon determining a lack of interaction or no proximity of a user, the system may prompt some combination of the hardware processor 101, the EC 112, or the plug and play device controller 120 to execute code instructions of the idle plug and play port freezing and CO2 minimizing system 180 to determine whether the power down one or more peripheral device (e.g., plug and play device) ports (e.g., 121, 122, 123, 124, 125, 126, or 127) and connected peripheral devices (e.g., 131, 132, 133, 134, 135, 136, or 137) to conserve power and reduce CO2 production, as described herein.

As described, the operating system 109 executing via the hardware processor 101, or the BIOS executing via the EC 112, may also provide information as to whether a user is currently present within close proximity to the information handling system 100, which may be collected at routine intervals from various sensor devices, or whether a user has had interaction with any I/O devices 110. For example, the operating system 109 may scan input from the microphone 141, camera 142, or IR sensor 143 or other external sensor to sense the presence of a user within a short range of the information handling system 100. More specifically, the operating system 109 may identify a user's voice within a recording received via the microphone 141. As another example, the operating system 109 may identify an image of the user, as captured by the camera 142. In further examples, the external sensor in an embodiment may comprise a microphone or a camera providing the same functionality as that described directly above. In yet other examples, the operating system 109 may identify user presence through the external sensors operating as a fingerprint scanner, a retinal scanner, or another proximity sensor. This operating system 109 in an example embodiment may comprise a Microsoft® Windows® operating system executing the Microsoft® Hello® code instructions to detect user presence. Upon detection of user presence, the operating system 109 in an embodiment may notify the idle plug and play port freezing and CO2 minimizing system 180 that user presence has been detected.

In an embodiment in which the idle plug and play port freezing and CO2 minimizing system 180 receives notification from the operating system 109 that the user interacted with the information handling system or that user presence has still been detected within the most recent routine scanning period, any combination of the hardware processor 101, the EC 112, or the plug and play device controller 120 may execute any portion of code instructions of the idle plug and play port freezing and CO2 minimizing system 180 to allow the PMU 128 to continue to supply power to one or more connected peripheral devices. For example, a user may set a display 132 to display a screen saver in between user log in sessions. As another example, some peripheral devices may be set according to firmware policies of the plug and play device controller 120 to remain powered on, even in between login sessions, when the user is still present in the close proximity of the information handling system 100. More specifically, external sensors such as microphones, cameras, or IR sensors may be set to remain powered on in order to scan the local environment surrounding the information handling system 100 and detect when the user has moved away from the information handling system 100. In such embodiments, once user presence is detected by any one of these external sensors, or via physical control exerted on the input/output device 110 (e.g., keyboard or mouse), the operating system 109 may resume scanning of the local environment through these devices at routine intervals.

In an embodiment in which the idle plug and play port freezing and CO2 minimizing system 180 receives notification from the operating system 109 that user presence has not been detected within the most recent routine scanning period or that a user has logged out, any combination of the hardware processor 101, the EC 112, or the plug and play device controller 120 may execute any portion of code instructions of the idle plug and play port freezing and CO2 minimizing system 180 to determine whether to throttle power supply to one or more connected peripheral devices (e.g., 131, 132, 133, 134, 135, 136, or 137). Any combination of the hardware processor 101, the EC 112, or the plug and play device controller 120 may execute any portion of code instructions of the idle plug and play port freezing and CO2 minimizing system 180 in an embodiment to request a status for each of the peripheral device ports (e.g., 121, 122, 123, 124, 125, 126, or 127) from the plug and play device controller 120 as well as access the port communications profiles for each peripheral device port. In an embodiment, the plug and play device controller 120 may determine and track which of these peripheral device ports (e.g., 121, 122, 123, 124, 125, 126, or 127) are currently transceiving either power or data, and transmit these status reports to the idle plug and play port freezing and CO2 minimizing system 180. In addition, in an embodiment in which the plug and play device controller 120 determines a peripheral device port is currently transceiving power or data, the plug and play device controller 120 may access port communications profiles for that peripheral device port to identify (e.g., via the USB Class Codes described above) the type or identity of the peripheral device connected as well as capabilities for data functions or permissions, such as for push notifications. The plug and play device controller 120 may have access to memory for storing these port communications profiles associated with each type of plug and play peripheral device operatively coupled to each peripheral device port managed by the plug and play device controller 120. These port communications profiles may determine identification of a peripheral device port, port protocol identification, and peripheral device identification and may further include the type of peripheral device operatively coupled to a port, the functional operations conducted with the peripheral device via the port such as read/write operations, or the capability or permissions to send or receive push notifications for the peripheral device operatively coupled to a port. These port communications profiles for each of these peripheral device ports (e.g., 121, 122, 123, 124, 125, 126, or 127) and operatively coupled peripheral devices (e.g., 131, 132, 133, 134, 135, 136, or 137) may be utilized by the idle plug and play port freezing and CO2 minimizing system according to embodiments of the present disclosure.

The plug and play device controller 120 may also access firmware of the plug and play device controller 120 to determine communication policies and session status for one or more of such peripheral devices (e.g., 121, 122, 123, 124, 125, 126, or 127). For example, the plug and play device controller 120 may determine, by reference to firmware communication policies assigned to device classes or specifically identified devices (e.g., by MAC address) whether the user or the operating system 109 has authorized transmission of push notifications from the peripheral device (e.g., Bluetooth® device 131, external speaker 135, gaming device 133, or network transceiver 137) to the operating system 109. As another example, the plug and play device controller 120 may determine, by reference to firmware communication policies assigned to device classes or specifically identified devices (e.g., by MAC address) whether the user or the operating system 109 has authorized automatic wireless communication link establishment between the peripheral device (e.g., Bluetooth® device 131, gaming device 133, or network transceiver 137) and the information handling system 100. As another example, the plug and play device controller 120 may determine whether a peripheral device is currently executing a read/write session with the information handling system 100 based on processor calls routed to and executed by the processor 101.

Determination of whether to throttle power supply to one or more connected peripheral devices (e.g., 131, 132, 133, 134, 135, 136, or 137) in an embodiment may depend upon the type of peripheral device connected to a given peripheral device port (e.g., 121, 122, 123, 124, 125, 126, or 127), whether an active read/write session is being executed via the processor 101 or the EC 112, and whether push notifications or automatic wireless link establishment has been enabled for the peripheral device. For example, in an embodiment in which the peripheral device (e.g., external drive 134) is associated with a USB class code identifying the device as a mass storage device, any combination of the hardware processor 101, the EC 112, or the plug and play device controller 120 may execute any portion of code instructions of the idle plug and play port freezing and CO2 minimizing system 180 to determine whether to throttle power supply to one or more connected peripheral devices (e.g., 131, 132, 133, 134, 135, 136, or 137) based on current read/write activity. More specifically, in an embodiment in which a mass storage device (e.g., external drive 134) is not currently engaged in a read/write session involving the hardware processor 101 or EC 112, any combination of the hardware processor 101, the EC 112, or the plug and play device controller 120 may execute any portion of code instructions of the idle plug and play port freezing and CO2 minimizing system 180 to throttle power supplied by the PMU 128 to the port 124. In such a way, the idle plug and play port freezing and CO2 minimizing system 180 in an embodiment may identify one or more peripheral devices (e.g., 134) operably connected to the information handling system 100 via peripheral device input/output (IO) ports (e.g., 124) managed by the plug and play device controller 120 that are currently idle, and throttle power to those peripheral devices to minimize power consumed and carbon dioxide (CO2) emitted due to operation of such idle peripheral devices.

In another example embodiment in which a mass storage device (e.g., external drive 134) is currently engaged in a read/write session involving the hardware processor 101 or EC 112, any combination of the hardware processor 101, the EC 112, or the plug and play device controller 120 may execute any portion of code instructions of the idle plug and play port freezing and CO2 minimizing system 180 to enter a wait mode for a preset period of time. At the end of this period, any combination of the hardware processor 101, the EC 112, or the plug and play device controller 120 may execute any portion of code instructions of the idle plug and play port freezing and CO2 minimizing system 180 to request an updated status for the port 124 operably connecting the external drive 134 to the plug and play device controller 120. Upon notification from the plug and play device controller 120 that the detected read/write session between the external drive 134 and the plug and play device controller 120 has ended, any combination of the hardware processor 101, the EC 112, or the plug and play device controller 120 may execute any portion of code instructions of the idle plug and play port freezing and CO2 minimizing system 180 to throttle power supplied by the PMU 128 to the port 124. In such a way, the idle plug and play port freezing and CO2 minimizing system 180 in an embodiment may identify one or more peripheral devices (e.g., 134) operably connected to the information handling system 100 via peripheral device input/output (IO) ports (e.g., 124) managed by the plug and play device controller 120 that are currently idle, and throttle power to those peripheral devices to minimize power consumed and carbon dioxide (CO2) emitted due to operation of such idle peripheral devices.

In still another example embodiment, the plug and play device controller 120 may identify the connected peripheral device (e.g., Bluetooth® device 131, display 132, gaming device 133, external speaker 135, printer 136, or network transceiver 137) as falling within a USB class code other than mass storage device. In such an embodiment, the hardware processor 101, EC 112, or the plug and play device controller 120 may execute any portion of the code instructions of the idle plug and play port freezing and CO2 minimizing system 180 to determine whether the peripheral device is authorized for push notifications or automatic communications, or whether an active read/write session is being executed. For example, the hardware processor 101, EC 112, or the plug and play device controller 120 may execute any portion of the code instructions of the idle plug and play port freezing and CO2 minimizing system 180 to identify one or more connected peripheral devices (e.g., 131, 133, 135, or 137) for which firmware communication policies indicate push notifications or automatic communications have been enabled. As another example, the hardware processor 101, EC 112, or the plug and play device controller 120 may execute any portion of the code instructions of the idle plug and play port freezing and CO2 minimizing system 180 to identify one or more connected peripheral devices (e.g., 131, 132, 133, 135, 136 or 137) for which firmware communication policies indicate push notifications or automatic communications have been disabled. Such identification may be determined from stored port communications profiles in an example embodiment. Where the user or the operating system 109 has enabled push notifications or automatic communications with a peripheral device in an embodiment, power may be continuously supplied to the peripheral device operably connected to the push-enabled peripheral device in order to meet the enabled functionalities set out in the communication policy for that peripheral device, such as receipt of push notifications or transceiving of data via an automatically established wireless link.

In an embodiment in which the user or the operating system 109 has not disabled push notifications and automatic communications with an operably connected peripheral device, the hardware processor 101, EC 112, or the plug and play device controller 120 may execute any portion of the code instructions of the idle plug and play port freezing and CO2 minimizing system 180 to determine whether to throttle power to the peripheral device port providing said operable connection based on status of read/write sessions with that peripheral device. For example, in an example embodiment, a peripheral device (e.g., 131, 132, 133, 135, 136 or 137) for which push notifications and automatic communications are disabled may not be currently engaged in a read/write session involving the hardware processor 101 or the EC 112. In such an example embodiment, any combination of the hardware processor 101, the EC 112, or the plug and play device controller 120 may execute any portion of code instructions of the idle plug and play port freezing and CO2 minimizing system 180 to throttle power supplied by the PMU 128 to the peripheral port (e.g., 121, 122, 123, 125, 126 or 127, respectively) providing operably connection between the information handling system 100 and the peripheral device (e.g., 131, 132, 133, 135, 136 or 137). In such a way, the idle plug and play port freezing and CO2 minimizing system 180 in an embodiment may identify one or more peripheral devices (e.g., 131, 132, 133, 135, 136 or 137) operably connected to the information handling system 100 via peripheral device input/output (IO) ports (e.g., 121, 122, 123, 125, 126 or 127, respectively) managed by the plug and play device controller 120 that are currently idle, and throttle power to those peripheral devices (e.g., 121, 122, 123, 125, 126 or 127, respectively) to minimize power consumed and carbon dioxide (CO2) emitted due to operation of such idle peripheral devices.

In another example embodiment, a peripheral device (e.g., 131, 132, 133, 135, 136 or 137) for which push notifications and automatic communications are disabled may be currently engaged in a read/write session involving the hardware processor 101. In such an example embodiment, any combination of the hardware processor 101, the EC 112, or the plug and play device controller 120 may execute any portion of code instructions of the idle plug and play port freezing and CO2 minimizing system 180 to enter a wait mode for a preset period of time. At the end of this period, any combination of the hardware processor 101, the EC 112, or the plug and play device controller 120 may execute any portion of code instructions of the idle plug and play port freezing and CO2 minimizing system 180 to request an updated status for the port (e.g., 121, 122, 123, 125, 126 or 127, respectively) operably connecting the push notification disabled peripheral device (e.g., 131, 132, 133, 135, 136 or 137) to the plug and play device controller 120. Upon notification from the plug and play device controller 120 that the detected read/write session between the push notification disabled peripheral device (e.g., 131, 132, 133, 135, 136 or 137) and the plug and play device controller 120 has ended, any combination of the hardware processor 101, the EC 112, or the plug and play device controller 120 may execute any portion of code instructions of the idle plug and play port freezing and CO2 minimizing system 180 to throttle power supplied by the PMU 128 to the port (e.g., 121, 122, 123, 125, 126 or 127, respectively) operably connecting the push notification disabled peripheral device (e.g., 131, 132, 133, 135, 136 or 137) to the plug and play device controller 120. In such a way, the idle plug and play port freezing and CO2 minimizing system 180 in an embodiment may identify one or more peripheral devices (e.g., 131, 132, 133, 135, 136 or 137) operably connected to the information handling system 100 via peripheral device input/output (IO) ports (e.g., 121, 122, 123, 125, 126 or 127, respectively) managed by the plug and play device controller 120 that are currently idle, and throttle power to those peripheral devices to minimize power consumed and carbon dioxide (CO2) emitted due to operation of such idle peripheral devices.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101 or EC 112 or other hardware processing resource. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing code instructions for systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 170. Further, the instructions 187 may be transmitted or received over the network 170 via the network interface device 160. The information handling system 100 may include a set of instructions 187 that may be executed to identify one or more peripheral devices operably connected to the information handling system 100 via peripheral device input/output (IO) ports managed by the plug and play device controller 120 that are currently idle, and throttling power to those peripheral devices to minimize power consumed and carbon dioxide (CO2) emitted due to operation of such idle peripheral devices. For example, instructions 187 may include a particular example of an idle plug and play port freezing and CO2 minimizing system 180, or other aspects or components. Various software modules comprising application instructions 187 may be coordinated by an operating system (OS), BIOS 150, firmware of the plug and play device controller 120, and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The idle plug and play port freezing and CO2 minimizing system 180 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the idle plug and play port freezing and CO2 minimizing system 180, firmware or software algorithms, processes, and/or methods may be stored here.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the idle plug and play port freezing and CO2 minimizing system 180 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express (PCIe) card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® Core class hardware processor, ARM® brand hardware processors, Qualcomm® hardware processors, or other hardware processors and chipsets, or other such device, or software capable of operating a relevant environment of the information handling system. The hardware system, hardware device, hardware controller, or hardware module may also comprise a combination of the foregoing examples of hardware, hardware processors, or controllers executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
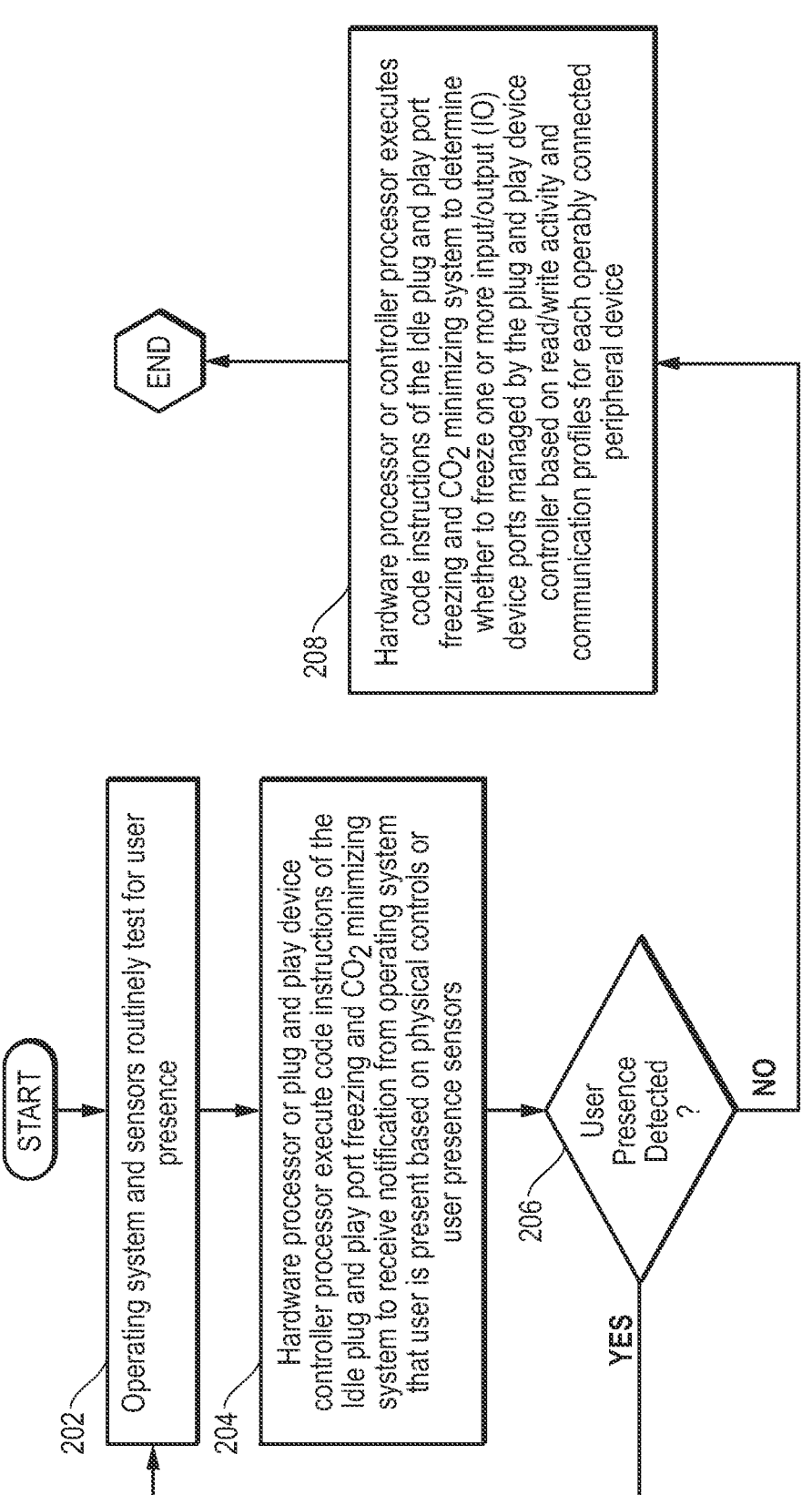
FIG. 2 is a flow diagram illustrating a method executing an idle plug and play port freezing and CO2 minimizing system for determining a level of current user interaction with the information handling system according to an embodiment of the present disclosure.

FIG. 2 is a flow diagram illustrating a method of determining a level of current user interaction with an information handling system operably connected to one or more peripheral devices according to an embodiment of the present disclosure. As described herein, a processor or controller executing code instructions of the idle plug and play port freezing and CO2 minimizing system may determine whether to throttle power to one or more peripheral devices operably connected to an information handling system based on user interaction with the information handling system. The level of current user interaction in an embodiment may be determined based on user login status or the presence of the user within the physical near proximity of the information handling system, as detected by various sensors or use of I/O devices for input to the information handling system.

At block 202, a hardware processor executing code instructions of an operating system in an embodiment may communicate with various sensors to routinely scan for the presence of a user within close proximity to the information handling system or detect user interaction with any of one or more I/O devices. For example, in an embodiment described with reference to FIG. 1, the operating system 109 may track when a user is currently logged into the operating system 109. Further, user interaction may be detected and status stored in non-volatile memory (e.g., 102, 103 or 107) accessible by the BIOS 150 when the operating system 109 is not currently executing to determine user interaction for a period of time. The hardware processor 101. EC 112, or plug and play device controller 120 in an embodiment may execute any portion of code instructions (e.g., BIOS code instructions) of the idle plug and play port freezing and CO2 minimizing system 180 to communicate with the operating system 109, the microphone 141, the camera 141, memory (102, 103, or 107), or any one of the peripheral device (e.g., plug and play device) ports (e.g., 121, 122, 123, 124, 125, 126, or 127) to receive an indication that the user is within close proximity of the information handling system 100.

At block 204, the operating system 109 may provide information as to whether a user is currently present within close proximity to the information handling system 100, which may be collected at routine intervals from various sensor devices. For example, the operating system 109 may scan input from external sensors such as the microphone 141, camera 142, or infrared (IR) sensor 143 to sense the presence of a user within a short range of the information handling system 100. More specifically, the operating system 109 may identify a user's voice within a recording received via the microphone 141. As another example, the operating system 109 may identify an image of the user, as captured by the camera 142. In further examples, the external sensor in an embodiment may comprise a microphone 141, a camera 142, or IR sensor 143 providing the same functionality as that described directly above. In yet other examples, the operating system 109 may identify user presence through an external sensor operating as a fingerprint scanner, a retinal scanner, or another biometric or proximity sensor (not shown). This operating system 109 in an example embodiment may comprise a Microsoft® Windows® operating system operating with a processor resource executing the Microsoft® Hello® code instructions to detect user presence. Moreover, the operating system 109 may detect and record in storage or memory a user interface occurrence via one or more I/O devices, such as a keyboard, touchpad, touchscreen or other I/O device or peripheral device usage to interact the information handling system 100. Upon detection of user presence, the operating system 109 in an embodiment may notify the idle plug and play port freezing and CO2 minimizing system 180 that user presence has been detected to determine whether the power down one or more connected peripheral devices (e.g., 131, 132, 133, 134, 135, 136, or 137), as described herein.

The hardware processor, EC, or a plug and play device controller in an embodiment at block 206 may execute code instructions of the idle plug and play port freezing and CO2 minimizing system to determine whether user presence has been detected within the close proximity of the information handling system. This information may have been transmitted to the idle plug and play port freezing and CO2 minimizing system 180 at block 204 from the operating system 109, for example. In an embodiment in which the idle plug and play port freezing and CO2 minimizing system 180 receives notification from the operating system 109 that user presence has been detected within the most recent routine scanning period, any combination of the hardware processor 101, the EC 112, or the plug and play device controller 120 may execute any portion of code instructions of the idle plug and play port freezing and CO2 minimizing system 180 to allow the PMU 128 to continue to supply power to one or more connected peripheral devices. For example, a user may set a display 132 to display a screen saver in between user log in sessions. As another example, some peripheral devices may be set according to firmware policies of the plug and play device controller 120 to remain powered on in between login sessions should a log off be detected or when the user is still present in the close proximity of the information handling system 100. More specifically, external sensors such as microphones 141, cameras 142, or IR sensors 143 may be set to remain powered on in order to scan the local environment surrounding the information handling system 100 and detect when the user has moved away from the information handling system 100. In such embodiments, once user presence is detected by any one of these external sensors or via physical control exerted on an input/output device 110 (e.g., keyboard or mouse), the operating system 109 may resume scanning of the local environment through these devices at routine intervals. If user presence has been detected, the method may proceed back to block 202 for such routine scanning. If user presence has not been detected, the method may proceed to block 208 for identification of peripheral device ports operably connecting idle peripheral devices to the information handling system 100 by type of peripheral device operatively coupled or by type of data transaction conducted.

The hardware processor, EC, or a plug and play device controller in an embodiment may execute code instructions of the idle plug and play port freezing and CO2 minimizing system at block 208 to determine whether to throttle power supplied to one or more input/output (IO) device ports operably connecting a peripheral device to the information handling system. As described in greater detail below with respect to FIG. 3, such a determination may be made based upon current read/write session activity and communication profiles for each operably connected peripheral device. For example, as described in greater detail below with respect to FIG. 3, the hardware processor, EC, or a plug and play device controller in an embodiment may execute code instructions of the idle plug and play port freezing and CO2 minimizing system to throttle power supplied to idle peripheral devices not currently engaged in an active read/write session with the information handling system and not enabled for push notifications or automatic communications. The method for determining a level of current user interaction with an information handling system operably connected to one or more peripheral devices may then end.

Figure 3:
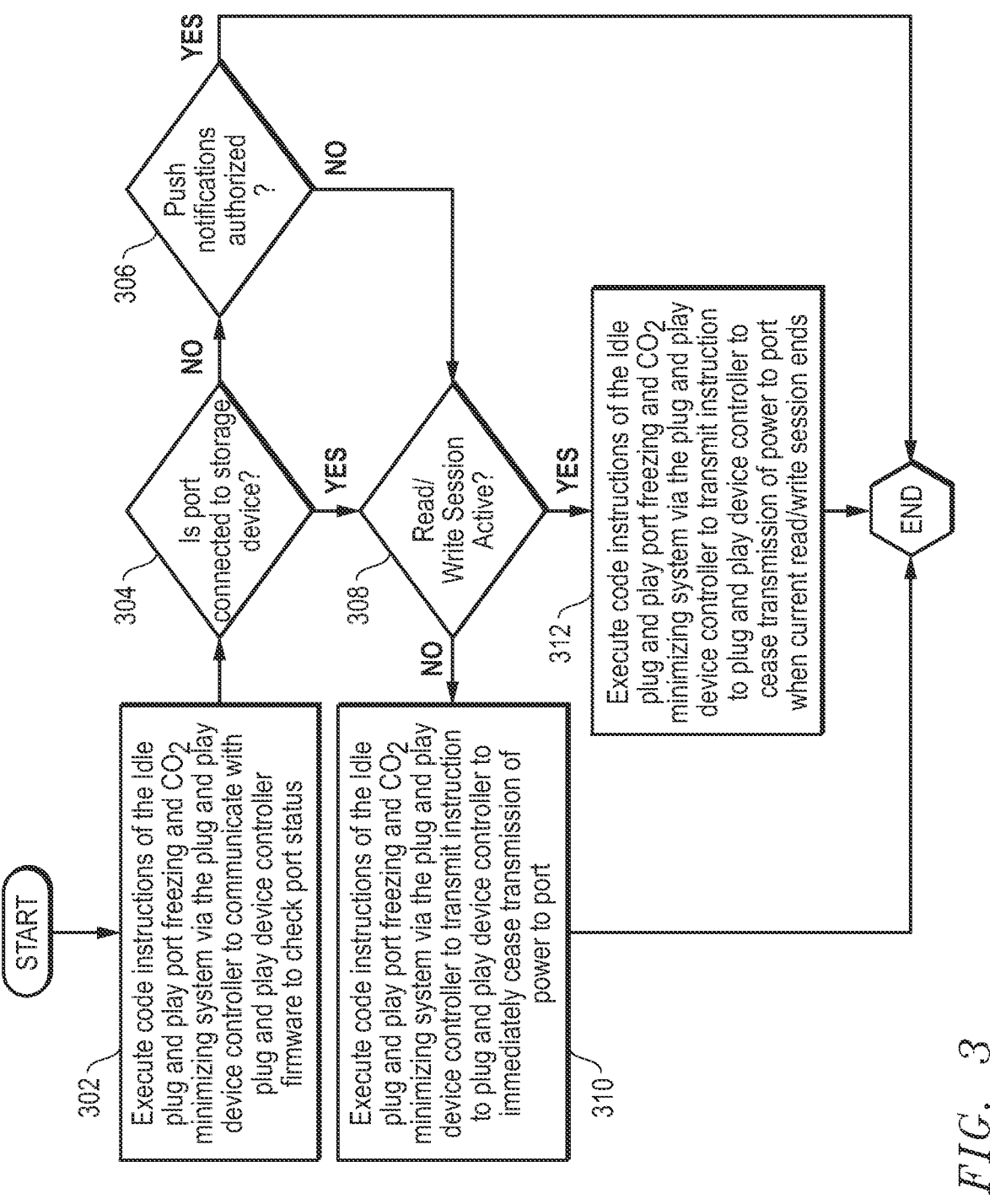
FIG. 3 is a flow diagram illustrating a method executing an idle plug and play port freezing and CO2 minimizing system for throttling power supplied to a peripheral device port operably connected to an idle peripheral device according to an embodiment of the present disclosure.

FIG. 3 is a flow diagram illustrating a method of throttling power supplied to a peripheral device port operably connected to an idle peripheral device to minimize power consumed and resultant carbon dioxide ($CO_2$) emissions according to an embodiment of the present disclosure. As described herein, an information handling system may execute code instructions of an idle plug and play port freezing and $CO_2$ minimizing system, via a hardware controller or a hardware processor, to identify one or more peripheral devices operably connected to the information handling system via peripheral device input/output (IO) ports managed by the hardware controller that are currently idle when a user is not present, and throttling power to those ports for certain peripheral devices to minimize power consumed and carbon dioxide ($CO_2$) emitted due to operation of such idle ports for those peripheral devices.

At block 302, the hardware processor, EC, or plug and play device controller may execute code instructions of the idle plug and play port freezing and $CO_2$ minimizing system to check the status of one or more peripheral device ports. For example, in an embodiment described with reference to FIG. 1, the idle plug and play port freezing and $CO_2$ minimizing system 180 receives notification from the operating system 109 that the user's presence has not been detected within the most recent routine scanning period. In such an embodiment, any combination of the hardware processor 101, the EC 112, or the plug and play device controller 120 may execute any portion of code instructions of the idle plug and play port freezing and $CO_2$ minimizing system 180 in an embodiment to request a status for each of the peripheral device ports (e.g., 121, 122, 123, 124, 125, 126, or 127) from the plug and play device controller 120. In an embodiment, the plug and play device controller 120 may determine and track which of these peripheral device ports (e.g., 121, 122, 123, 124, 125, 126, or 127) are currently transceiving either power or data, and transmit these status reports to the idle plug and play port freezing and $CO_2$ minimizing system 180. In addition, in an embodiment in which the plug and play device controller 120 determines a peripheral device port is currently transceiving power or data, the plug and play device controller 120 may identify (e.g., via the USB Class Codes described above) the type or identity of the peripheral device connected.

The plug and play device controller 120 may also access firmware of the plug and play device controller 120 and stored port communication profiles for a candidate port to determine communication policies and session status for one or more of such peripheral devices (e.g., 131, 132, 133, 134, 135, 136, or 137) of the respective peripheral device ports (e.g., 121, 122, 123, 124, 125, 126, or 127). The plug and play device controller 120 may access store port communication profiles for the peripheral devices (e.g., 131, 132, 133, 134, 135, 136, or 137) and respective peripheral device ports (e.g., 121, 122, 123, 124, 125, 126, or 127) for use with the idle plug and play port freezing and $CO_2$ minimizing system. For example, the plug and play device controller 120 may determine, by reference to firmware communication policies assigned to device classes or specifically identified devices (e.g., by MAC address) and access port communication profiles indicating whether the user or the operating system 109 has authorized transmission of push notifications from the peripheral device (e.g., Bluetooth® device 131, external sensor 135, gaming device 133, or network transceiver 137) to the operating system 109 for each candidate peripheral device port assessed among peripheral device ports (e.g., 121, 122, 123, 124, 125, 126, or 127). As another example, the plug and play device controller 120 may determine, by reference to firmware communication policies assigned to device classes or specifically identified devices (e.g., by MAC address) or access to port communication profiles for each candidate peripheral device port whether the user or the operating system 109 has authorized automatic wireless communication link establishment between the peripheral device (e.g., Bluetooth® device 131, gaming device 133, or network transceiver 137) and the information handling system 100. As another example, the plug and play device controller 120 may determine whether a peripheral device is currently executing a read/write session with the information handling system 100 based on processor calls routed to and executed by the processor 101 or EC 112.

The hardware processor, EC, or plug and play device controller may execute code instructions of the idle plug and play port freezing and $CO_2$ minimizing system in an embodiment at block 304 to determine whether a given peripheral device port is operably connected to a mass storage device. As described herein, determination of whether to throttle power supply to one or more connected peripheral devices (e.g., 131, 132, 133, 134, 135, 136, or 137) in an embodiment may depend upon the type of peripheral device connected to a given peripheral device port (e.g., 121, 122, 123, 124, 125, 126, or 127). For example, in an embodiment in which the peripheral device (e.g., external drive 134) is associated with a USB class code identifying the device as a mass storage device, any combination of the hardware processor 101, the EC 112, or the plug and play device controller 120 may execute any portion of code instructions of the idle plug and play port freezing and $CO_2$ minimizing system 180 to determine whether to throttle power supply to one or more connected peripheral devices (e.g., 131, 132, 133, 134, 135, 136, or 137) based on current read/write activity. Thus, if it is determined that the operably connected peripheral device is a mass storage device, the method may proceed to block 308 for determination as to whether to throttle power to the power based on the current read/write session status between the mass storage device and the information handling system. If it is determined that the operably connected peripheral device is not a mass storage device, the method may proceed to block 306 to determine whether power should be throttled to the port based on authorization status of the operably connected peripheral device to send push notifications or to automatically establish wireless communications with the information handling system.

At block 306, in an embodiment in which the plug and play port is not operably connected to a mass storage device, the hardware processor, EC, or plug and play device controller may execute code instructions of the idle plug and play port freezing and $CO_2$ minimizing system to determine an authorization status of the operably connected peripheral device to send push notifications or to automatically establish wireless communications with the information handling system. As described herein, determination of whether to throttle power supply to one or more connected peripheral devices (e.g., 131, 132, 133, 134, 135, 136, or 137) in an embodiment may depend upon whether push notifications or automatic wireless link establishment has been enabled for the peripheral device as determined from port communication profiles for a given candidate port.

For example, the plug and play device controller 120 may identify the connected peripheral device (e.g., Bluetooth® device 131, display 132, gaming device 133, external sensor 135, printer 136, or network transceiver 137) as falling within a USB class code other than mass storage device based on a port communication profile for a candidate port. In such an embodiment, the hardware processor 101, EC 112, or the plug and play device controller 120 may execute any portion of the code instructions of the idle plug and play port freezing and CO2 minimizing system 180 to determine whether the peripheral device is authorized for push notifications or automatic communications. For example, the hardware processor 101, EC 112, or the plug and play device controller 120 may execute any portion of the code instructions of the idle plug and play port freezing and CO2 minimizing system 180 to identify one or more connected peripheral devices (e.g., 131, 133, 135, or 137) for which firmware communication policies indicate push notifications or automatic communications have been enabled as determined from the port communication profile for the candidate port. As another example, the hardware processor 101, EC 112, or the plug and play device controller 120 may execute any portion of the code instructions of the idle plug and play port freezing and CO2 minimizing system 180 to identify one or more connected peripheral devices (e.g., 131, 132, 133, 135, 136 or 137) for which firmware communication policies indicate push notifications or automatic communications have been disabled from the port communication profiles stored for the candidate ports. Where the user of the operating system 109 has enabled push notifications or automatic communications with a peripheral device in an embodiment, power may be continuously supplied to the peripheral device operably connected to the push-enabled peripheral device in order to meet the enabled functionalities set out in the communication policy for that peripheral device, such as receipt of push notifications or transceiving of data via an automatically established wireless link. The method for throttling power supplied to a peripheral device port operably connected to an idle peripheral device to minimize power consumed and resultant CO2 emissions may then end. Where the idle plug and play port freezing and CO2 minimizing system 180 determines push notifications are not authorized for a candidate port, flow may proceed to block 308.

The hardware processor, EC, or plug and play device controller at block 308 may execute code instructions of the idle plug and play port freezing and CO2 minimizing system to determine whether a read/write session is currently executing between the peripheral device and the information handling system as determined by the plug and play device controller managing the candidate ports. This may occur in an embodiment in which the operably connected peripheral device to a candidate port is a mass storage device, or in which the operably connected peripheral device to a candidate port is a non-storage device that is not authorized to send push notifications or to automatically establish wireless communications with the information handling system 100. In each of these cases, the peripheral device may only need to remain fully powered if the peripheral device is currently engaged in a read/write session with the hardware processor 101 of the information handling system 100. If the peripheral device is currently engaged in a read/write session with the hardware processor of the information handling system, the method may proceed to block 312 for throttling of power supplied to the port operably connecting the peripheral device to the information handling system upon completion of the currently executing read/write session. If the peripheral device is not currently engaged in a read/write session with the hardware processor of the information handling system, the method may proceed to block 310 for immediate throttling of power supplied to the port operably connecting the peripheral device to the information handling system.

At block 310, in an embodiment in which the peripheral device is not currently engaged in a read/write session with the information handling system, the hardware processor, EC, or plug and play device controller may execute code instructions of the idle plug and play port freezing and CO2 minimizing system to immediately throttle power supplied to the port operably connecting the peripheral device to the information handling system. For example, in an embodiment in which a mass storage device (e.g., external drive 134) is not currently engaged in a read/write session involving the hardware processor 101, any combination of the hardware processor 101, the EC 112, or the plug and play device controller 120 may execute any portion of code instructions of the idle plug and play port freezing and CO2 minimizing system 180 to throttle power supplied by the PMU 128 to the port 124. In such a way, the idle plug and play port freezing and CO2 minimizing system 180 in an embodiment may identify one or more peripheral devices (e.g., 134) operably connected to the information handling system 100 via peripheral device input/output (IO) ports (e.g., 124) managed by the plug and play device controller 120 that are currently idle and able to have power throttled. Thus, plug and play device controller may be instructed by the idle plug and play port freezing and CO2 minimizing system 180 to throttle power to those ports for those idle peripheral devices to minimize power consumed and carbon dioxide (CO2) emitted due to operation of such idle peripheral devices. The method for throttling power supplied to a peripheral device port operably connected to an idle peripheral device to minimize power consumed and resultant carbon dioxide CO2 emissions may then end.

In another example embodiment, a peripheral device (e.g., 131, 132, 133, 135, 136 or 137) for which push notifications and automatic communications are disabled may not be currently engaged in a read/write session involving the hardware processor 101 or the EC 112. In such an example embodiment, any combination of the hardware processor 101, the EC 112, or the plug and play device controller 120 may execute any portion of code instructions of the idle plug and play port freezing and CO2 minimizing system 180 to instruct the plug and play device controller 120 to throttle power supplied by the PMU 128 to the peripheral port (e.g., 121, 122, 123, 125, 126 or 127, respectively) providing operably connection between the information handling system 100 and the peripheral device (e.g., 131, 132, 133, 135, 136 or 137). In such a way, the idle plug and play port freezing and CO2 minimizing system 180 in an embodiment may identify one or more peripheral devices (e.g., 131, 132, 133, 135, 136 or 137) operably connected to the information handling system 100 via peripheral device input/output (IO) ports (e.g., 121, 122, 123, 125, 126 or 127, respectively) managed by the plug and play device controller 120 that are currently idle, and throttle power to those peripheral devices (e.g., 121, 122, 123, 125, 126 or 127, respectively) to minimize power consumed and carbon dioxide (CO2) emitted due to operation of such idle peripheral devices. The method for throttling power supplied to a peripheral device port operably connected to an idle peripheral device to minimize power consumed and resultant carbon dioxide CO2 emissions may then end.

In an embodiment in which the peripheral device is not currently engaged in a read/write session with the information handling system, the hardware processor, EC, or plug and play device controller at block 312 may execute code instructions the idle plug and play port freezing and CO2 minimizing system to instruct the plug and play device controller 120 to throttle power supplied to the port operably connecting the peripheral device to the information handling system upon completion of the currently executing read/write session. For example, in an embodiment in which a mass storage device (e.g., external drive 134) is currently engaged in a read/write session involving the hardware processor 101, any combination of the hardware processor 101, the EC 112, or the plug and play device controller 120 may execute any portion of code instructions of the idle plug and play port freezing and CO2 minimizing system 180 to enter a wait mode for a preset period of time. At the end of this period, any combination of the hardware processor 101, the EC 112, or the plug and play device controller 120 may execute any portion of code instructions of the idle plug and play port freezing and CO2 minimizing system 180 to request an updated status for the port 124 operably connecting the external drive 134 to the plug and play device controller 120. Upon notification from the plug and play device controller 120 that the detected read/write session between the external drive 134 and the plug and play device controller 120 has ended, any combination of the hardware processor 101, the EC 112, or the plug and play device controller 120 may execute any portion of code instructions of the idle plug and play port freezing and CO2 minimizing system 180 instruct a throttle of power supplied by the PMU 128 to the port 124. In such a way, the idle plug and play port freezing and CO2 minimizing system 180 in an embodiment may identify one or more peripheral devices (e.g., 134) operably connected to the information handling system 100 via peripheral device input/output (IO) ports (e.g., 124) managed by the plug and play device controller 120 that are currently idle, and throttle power to those peripheral devices to minimize power consumed and carbon dioxide (CO2) emitted due to operation of such idle peripheral devices. The method for throttling power supplied to a peripheral device port operably connected to an idle peripheral device to minimize power consumed and resultant carbon dioxide CO2 emissions may then end.

In another example embodiment, a peripheral device (e.g., 131, 132, 133, 135, 136 or 137) for which push notifications and automatic communications are disabled may be currently engaged in a read/write session involving the hardware processor 101. In such an example embodiment, any combination of the hardware processor 101, the EC 112, or the plug and play device controller 120 may execute any portion of code instructions of the idle plug and play port freezing and CO2 minimizing system 180 to enter a wait mode for a preset period of time. At the end of this period, any combination of the hardware processor 101, the EC 112, or the plug and play device controller 120 may execute any portion of code instructions of the idle plug and play port freezing and CO2 minimizing system 180 to request an updated status for the port (e.g., 121, 122, 123, 125, 126 or 127, respectively) operably connecting the push notification disabled peripheral device (e.g., 131, 132, 133, 135, 136 or 137) to the plug and play device controller 120. Upon notification from the plug and play device controller 120 that the detected read/write session between the push notification disabled peripheral device (e.g., 131, 132, 133, 135, 136 or 137) and the plug and play device controller 120 has ended, any combination of the hardware processor 101, the EC 112, or the plug and play device controller 120 may execute any portion of code instructions of the idle plug and play port freezing and CO2 minimizing system 180 to instruct the plug and play device controller 120 to throttle power supplied by the PMU 128 to the port (e.g., 121, 122, 123, 125, 126 or 127, respectively) operably connecting the push notification disabled peripheral device (e.g., 131, 132, 133,

135, 136 or 137) to the plug and play device controller 120. In such a way, the idle plug and play port freezing and CO2 minimizing system 180 in an embodiment may identify one or more peripheral devices (e.g., 131, 132, 133, 135, 136 or 137) operably connected to the information handling system 100 via peripheral device input/output (IO) ports (e.g., 121, 122, 123, 125, 126 or 127, respectively) managed by the plug and play device controller 120 that are currently idle, and throttle power to those peripheral devices to minimize power consumed and carbon dioxide (CO2) emitted due to operation of such idle peripheral devices. The method for throttling power supplied to a peripheral device port operably connected to an idle peripheral device to minimize power consumed and resultant carbon dioxide CO2 emissions may then end.

The blocks of the flow diagrams of FIGS. 2 and 3 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An idle plug and play port freezing and carbon dioxide (CO2) minimizing system executing on an information handling system comprising:

a hardware processor, a memory, and a power source;

the hardware processor and a plug and play device controller executing code instructions of the idle plug and play port freezing and CO2 minimizing system to receive a notification from an operating system of the information handling system that a user presence is not detected;

the hardware processor and the plug and play device controller executing code instructions of the idle plug and play port freezing and CO2 minimizing system to identify a first peripheral device port of a plurality of peripheral device ports managed by the plug and play device controller of the information handling system that is operably connected to a first peripheral device;

the plug and play device controller to receive an associated first port communications profile from the first peripheral device and stored the associated first port communications profile in memory of the information handling system, where the associated first port communications profile indicates an automatic push notifications feature status of the first peripheral device as not enabled for the first peripheral device port; and the hardware processor and the plug and play device controller executing code instructions of the idle plug and play port freezing and CO2 minimizing system to throttle power to the first peripheral device port of the plurality of peripheral device ports in an absence of a read/write session currently executing at the first peripheral device port and when the associated first port communications profile indicates that the automatic push notifications feature are not enabled at the first peripheral device port to decrease power consumption and CO2 emissions by the first peripheral device port and operatively coupled first peripheral device when the information handling system is not actively in use by a user.

2. The idle plug and play port freezing and CO2 minimizing system of claim 1, wherein the first peripheral device includes a Bluetooth® transceiver for wireless communication.

3. The idle plug and play port freezing and CO2 minimizing system of claim 1, wherein the first peripheral device includes a wired local area network (LAN) transceiver.

4. The idle plug and play port freezing and CO2 minimizing system of claim 1, wherein the first peripheral device is a gaming device controller.

5. The idle plug and play port freezing and CO2 minimizing system of claim 1, wherein the first peripheral device is a printer.

6. The idle plug and play port freezing and CO2 minimizing system of claim 1 further comprising:

the hardware processor and the plug and play device controller executing code instructions to identify a second peripheral device port of the plurality of peripheral device ports operably connected to a second peripheral device and receiving an associated second port communications profile for the second peripheral device indicating the automatic push notifications feature status that the automatic push notifications feature is enabled for the second peripheral device port; and the hardware processor and the plug and play device controller executing code instructions to continue supplying power to the second peripheral device port when the information handling system is not actively in use by the user.

7. The idle plug and play port freezing and CO2 minimizing system of claim 1 further comprising:

the plug and play device controller executing firmware code instructions to determine that the read/write session is currently executing at the first peripheral device port between the first peripheral device and a processor of the information handling system; and the idle plug and play port freezing and CO2 minimizing system to throttle supplying power to the first peripheral device port upon completion of the currently executing read/write session.

8. A method of freezing an idle plug and play port of an information handling system to minimize power consumption and carbon dioxide (CO2) emissions comprising:

receiving a notification at a hardware controller at the information handling system that a user presence is not detected at the information handling system, wherein the information handling system includes a hardware processor, a memory, and a power source;

receiving, at the hardware controller, an associated first peripheral communications profile for a first peripheral device connected through a first peripheral device port including a Universal Serial Bus (USB) class code associated with the first peripheral device;

executing code instructions of an idle plug and play port freezing and CO2 minimizing system, via the hardware controller, to determine that the USB class code associated with a first peripheral device port of the information handling system operably connecting the first peripheral device to the information handling system identifies a functionality of the first peripheral device as a mass storage device and indicates a status of an automatic push notifications feature for the first peripheral device that automatic posh notifications are disabled for the first peripheral device port to the hardware controller of the information handling system; and executing code instructions of the idle plug and play port freezing and CO2 minimizing system to instruct throttling power supplied from the power source to the first peripheral device port upon receiving indication from the hardware processor of the information handling system of an absence of a read/write session currently executing at the hardware processor with the first peripheral device port operatively coupled to the first peripheral device to decrease power consumption and CO2 emissions by the first peripheral device port and the first peripheral device when the information handling system is not actively in use by a user.

9. The method of claim 8 further comprising:

executing code instructions of the idle plug and play port freezing and CO2 minimizing system to determine a current read/write session is currently executing between the first peripheral device and the information handling system on the first peripheral device port; and issuing an instruction to throttle supplying power to the plug and play port upon completion of the current read/write session.

10. The method of claim 8, wherein the first peripheral device is an external hard drive.

11. The method of claim 8 further comprising:

determining that the user presence is not detected based on input from a microphone of the information handling system.

12. The method of claim 8 further comprising:

determining that the user presence is not detected based on input from a camera of the information handling system.

13. The method of claim 8, wherein the hardware controller is a Thunderbolt® controller.

14. The method of claim 8, wherein the first peripheral device port is among the plurality of peripheral device ports on a docking station for the information handling system.

15. An idle plug and play port freezing and carbon dioxide (CO2) minimizing system executing on an information handling system comprising:

a hardware processor, a memory, and a power source;

a plug and play device controller for managing a plurality of peripheral device ports and executing, with an embedded controller, basic input/output system (BIOS) code instructions of the idle plug and play port freezing and CO2 minimizing system to receive a notification from an operating system of the information handling system that a user presence is not detected;

the plug and play device controller executing the BIOS code instructions of the idle plug and play port freezing and CO2 minimizing system to identify a first peripheral device port of the plurality of peripheral device ports that is operably connected to a first peripheral device;

the plug and play device controller to receive an associated first peripheral communications profile for the first peripheral device connected through the first peripheral device port indicating a status of an automatic push notifications feature for the first peripheral device and storing the associated first peripheral communications profile in the memory of the information handling system indicating that automatic push notification communications are disabled for the first peripheral device port;

the plug and play device controller executing firmware code instructions to determine that a read/write session is currently executing between the first peripheral device and a hardware processor of the information handling system via the first peripheral device port; and the plug and play device controller executing the BIOS code instructions of the idle plug and play port freezing and CO2 minimizing system to throttle power supplied to the first peripheral device port upon completion of the currently executing read/write session between the first peripheral device and the hardware processor of the information handling system to decrease power consumption and CO2 emissions by the first peripheral device port when the information handling system is not actively in use by a user.

16. The idle plug and play port freezing and CO2 minimizing system of claim 15 further comprising:

the plug and play device controller executing the BIOS code instructions of the idle plug and play port freezing and CO2 minimizing system to identify a second peripheral device port of the plurality of peripheral device ports operably connected to a Bluetooth® network compatible second peripheral device and associated with a second communications profile that indicates the automatic push notifications feature is enabled or that wireless connections may be automatically enabled between the information handling system and the second peripheral device; and the plug and play device controller to continue to supply power to the second peripheral device port when the information handling system is not actively in use by the user.

17. The idle plug and play port freezing and CO2 minimizing system of claim 15, wherein the first peripheral device is a gaming software application controller.

18. The idle plug and play port freezing and CO2 minimizing system of claim 15, wherein the first peripheral device includes a wireless local area network (WLAN) transceiver.

19. The idle plug and play port freezing and CO2 minimizing system of claim 15, wherein the first peripheral device includes a wireless wide area network (WWAN) transceiver.

20. The idle plug and play port freezing and CO2 minimizing system of claim 15, wherein the plug and play device controller is a Thunderbolt® controller and some portion of the plurality of peripheral device ports are on an information handling docking station operatively coupled to the information handling system.

\* \* \* \* \*